US011135604B2

(12) United States Patent
Hansen

(10) Patent No.: US 11,135,604 B2
(45) Date of Patent: Oct. 5, 2021

(54) PRETREATED WASTEWATER SPRAY SYSTEM

(71) Applicant: Christopher L. Hansen, Newbury, OH (US)

(72) Inventor: Christopher L. Hansen, Newbury, OH (US)

(*) Notice: Subject to any disclaimer, the term of this patent is extended or adjusted under 35 U.S.C. 154(b) by 126 days.

(21) Appl. No.: 16/026,863

(22) Filed: Jul. 3, 2018

(65) Prior Publication Data

US 2019/0015846 A1 Jan. 17, 2019

Related U.S. Application Data

(60) Provisional application No. 62/532,041, filed on Jul. 13, 2017.

(51) Int. Cl.
*B05B 1/00* (2006.01)
*A01G 25/00* (2006.01)
(Continued)

(52) U.S. Cl.
CPC ............... *B05B 1/00* (2013.01); *A01G 25/00* (2013.01); *B05B 1/14* (2013.01); *B05B 1/3006* (2013.01);
(Continued)

(58) Field of Classification Search
CPC .. A01G 25/00–167; B05B 15/74; B05B 1/00; B05B 1/14; B05B 1/3006;
(Continued)

(56) References Cited

U.S. PATENT DOCUMENTS 6,132,138 A * 10/2000 Haese ................... A01N 25/00
405/37
7,988,071 B2 * 8/2011 Bredberg .............. B05B 3/0454
239/203

(Continued)

*Primary Examiner* — Joseph A Greenlund
*Assistant Examiner* — Juan C Barrera
(74) *Attorney, Agent, or Firm* — Tarolli, Sundheim, Covell & Tummnio LLP

(57) ABSTRACT

A sprayer system for spraying water, onto and for absorption by, a surrounding area, such as used in wastewater treatment. The sprayer system includes a substantially vertical tubular housing extending from a well base to a distal end from which water communicated to the sprayer system is discharged. The tubular housing includes an inner tubular casing slidably supporting a piston assembly which is movable from the well base to the distal end in response to water communicated from a source to the well base. The piston assembly includes a primary check valve that is biased into engagement with an associated seat and includes a spray nozzle located downstream of the main check valve. When water from the source is applied to an effective pressure area on the piston assembly, an upwardly directed force is applied to the piston assembly when water is delivered to the well base. At least one bypass passage communicates bypass water to a region defined between the piston housing and an inside wall of the tubular casing so that warming water is delivered from the well base and flows around the outside surface of the piston assembly, whereby icing, which would otherwise block movement of the piston assembly, is inhibited.

11 Claims, 12 Drawing Sheets

(51) Int. Cl.
*C02F 9/00* (2006.01)
*B05B 1/14* (2006.01)
*B05B 1/30* (2006.01)
*B05B 12/00* (2018.01)
*B05B 1/32* (2006.01)
*B05B 15/74* (2018.01)
*C02F 1/32* (2006.01)
*C02F 103/00* (2006.01)
*C02F 3/28* (2006.01)
*C02F 3/02* (2006.01)
*B05B 12/08* (2006.01)

(52) U.S. Cl.
CPC ............ *B05B 1/326* (2013.01); *B05B 12/008* (2013.01); *B05B 15/74* (2018.02); *C02F 9/00* (2013.01); *B05B 12/081* (2013.01); *C02F 1/32* (2013.01); *C02F 3/02* (2013.01); *C02F 3/28* (2013.01); *C02F 2103/005* (2013.01)

(58) Field of Classification Search
CPC ..... B05B 1/326; B05B 12/008; B05B 12/081; C02F 9/00; C02F 1/32; C02F 3/02; C02F 3/28; C02F 2103/005
USPC ................................ 239/200–208, 210, 302
See application file for complete search history.

(56) References Cited

U.S. PATENT DOCUMENTS

| | | | |
|---|---|---|---|
| 2003/0111549 A1* | 6/2003 | McNulty | B05B 15/74 239/203 |
| 2003/0217977 A1* | 11/2003 | Rosen | C02F 1/008 210/739 |
| 2007/0119965 A1* | 5/2007 | Roney | B05B 15/74 239/73 |
| 2014/0339333 A1* | 11/2014 | Wright, III | A01G 25/167 239/204 |
| 2016/0136662 A1* | 5/2016 | Clark | A01G 25/00 239/205 |

* cited by examiner

PRETREATED WASTEWATER SPRAY SYSTEM

RELATED APPLICATION

This application claims the benefit of U.S. Provisional Patent Application Ser. No. 62/532,041, filed on Jul. 13, 2017, the disclosure of which is entirely incorporated herein by reference.

TECHNICAL FIELD

The present invention relates generally to wastewater treatment and, in particular, to a sprayer system for spraying pretreated wastewater for absorption by a surrounding area.

BACKGROUND ART

A couple of years ago a sewage treatment process was developed using three separate processes. Anaerobic, aerobic, and Ultra Violet Light processes working together and was found to performed at a much higher bacteria kill rate than the typical aeration systems that are currently being used today. The treated water is sprayed over a thirty one foot radius in most cases, thirty eight feet for larger homes. There is no smell and the water color is water/white. The advantage to this system is that you can install systems all year long and it is more economical for families. The process does a much better job regarding water quality than what is being done today and the systems can be installed using deep boring machines. Ohio and Pennsylvania are the most system populated to date but the idea is becoming much more widely accepted.

SUMMARY OF THE INVENTION

The present invention provides a new and improved sprayer system for use in wastewater treatment systems and irrigation systems. For wastewater treatment applications, the present invention provides a sprayer system that is fluidly connected with a wastewater treatment system that includes at least one treatment tank for receiving wastewater from a home or facility. When used as part of an irrigation system, the sprayer system of the present invention is fluidly connected to a source of potable water or water compatible with an area being irrigated.

According to the invention, the sprayer system, which is operative to spray water onto a surrounding area, includes a substantially vertical tubular housing assembly extending from the well base to a distal end from which water communicated to the sprayer system is discharged onto an area that at least partially surrounds the sprayer system. The well base is located below ground level, preferably below a frost line and the distal end is located above ground level. The tubular housing assembly slidably supports a piston assembly which is movable from the well base to the distal end in response to water communicated from a source of water to the well base. The piston assembly includes a piston housing, a primary check valve carried by the piston housing that is biased into engagement with an associated seal and a spray nozzle located upstream of the main check valve. With this arrangement, the flow of water to the nozzle is blocked when the main check valve sealingly engages its associated seat and the flow of water is allowed to proceed to a main flow passage when the main check valve is disengaged from its associated seat. The piston assembly defines an effective pressure area in fluid communication with water communicated to the well base, such that water in the well base exerts an upwardly directed force to the piston assembly causing the piston assembly to move from the well base to the distal end of the sprayer housing assembly.

According to the invention, the piston assembly includes at least one bypass passage for communicating bypass water to a region defined between the piston housing and an inside wall of the tubular housing assembly. This bypass passage allows a small portion of the water delivered to the well base to flow around an outside surface of the piston assembly, whereby icing in the tubular housing assembly is inhibited, which otherwise could inhibit movement of the piston assembly.

According to a feature of the invention, the well base serves as a geothermal heat chamber that is positioned below the frost line (which is typically 36 to 42 inches below ground level in the Northeastern United States). This feature allows the chamber to use the below ground heat to communicate warmth to the housing assembly to prevent jamming of the piston assembly due to the formation of ice in the housing assembly.

In the preferred and illustrated embodiment, the tubular housing assembly includes an inner tubular casing located concentrically within an outer housing tube. The inner tubular casing slidably supports the piston assembly.

In the preferred and illustrated embodiment, the piston assembly includes a radial seal located upstream of the main check valve. In this embodiment, the bypass passage is located below the main check valve and above the radial seal.

In the preferred and illustrated embodiment, the bypass passage is restrictive and the bypass water flowing through the bypass passage is a substantially smaller portion of the water delivered to the well base. In this preferred embodiment, the piston assembly further includes at least one return passage for communicating the bypass water to the main flow passage so that both the water in the main flow passage and the bypass water are delivered to the spray nozzle.

According to one preferred embodiment, the spray nozzle carried by the piston assembly includes a plurality of fixed orifices which spray water radially outwardly when the piston assembly reaches a distal end of the tubular housing.

According to another preferred embodiment, the nozzle comprises a slot and a plunger for adjusting the effective opening of the slot, so that the spray pattern can be adjusted. In a more preferred embodiment, the spray pattern of the slotted nozzle can be adjusted without requiring disassembly of the sprayer system or the removal of the piston assembly from the housing assembly.

In the preferred and illustrated embodiment, the piston assembly includes an air bleed for allowing air delivered to the well base to escape when the pumping of the water to the spray system is initiated.

According to the preferred and illustrated embodiment, the sprayer system includes a dust cap located at the distal end of the sprayer housing and the piston assembly includes a dust cap opening member which engages the dust cap and moves it to a spaced position when the piston assembly reaches its spraying position at the distal end of the sprayer housing.

According to a feature of a more preferred embodiment, a piston housing mounts a plurality of magnets and the sprayer system further includes at least one, but preferably a pair of metal strips associated with the magnets. The metal strips are mounted between an inner tubular casing and an outer tubular housing of the sprayer assembly and are arranged so that the magnets mounted to the piston assembly are attracted to the metal strips whereby the piston assembly is maintained in a predetermined rotative position within the sprayer assembly.

According to still another feature of a preferred embodiment, the well base mounts a throttling valve for adjusting the quantity or rate of flow of water delivered to a region below the piston assembly. The throttling assembly includes an adjustment member extending to the distal end of the sprayer housing, whereby the throttling valve can be adjusted by a tool that engages an upper end of the adjustment member.

According to another feature of this embodiment, the sprayer system includes a conduit extending from the water receiving region in the well base to the distal end of the sprayer housing. The conduit has a conduit distal end located near the distal end of the sprayer housing whereby a pressure gauge can be attached in order to monitor the fluid pressure of water delivered to the base.

When the disclosed sprayer system forms part of a wastewater treatment system, the sprayer system is connected to a treatment tank which typically contains treated wastewater. When sufficiently treated, wastewater is accumulated in the treatment tank, a level sensor, such as a float mechanism can signal a control system that the wastewater in the tank needs to be delivered to the spray system. In accordance with this embodiment, a pump is activated, (preferably at nighttime) and pumps treated wastewater from the treatment tank to the spray system. The delivery of wastewater under pressure to the well base of the sprayer system creates an upwardly directed force on the piston assembly which, in turn, causes the piston assembly to move upwardly from its rest position in the well base, to its spraying position at the distal end of the sprayer housing at which the sprayer nozzle forming part of the piston assembly sprays the wastewater outwardly onto the area surrounding the sprayer system.

When the sprayer system is part of an irrigation system, water suitable for irrigation is delivered to the sprayer system where the application of this water produces an upwardly directed force on the piston assembly, driving it upwardly to the distal end of the sprayer housing at which the water is sprayed onto the surrounding area. In both applications, a dust cap located at the top of the sprayer assembly is moved to a spaced position as the piston assembly reaches the distal end of the sprayer assembly.

Additional features of the invention will become apparent and a fuller understanding obtained by reading the following detailed description made with the accompanying drawings.

DETAILED DESCRIPTION

Figure 1:
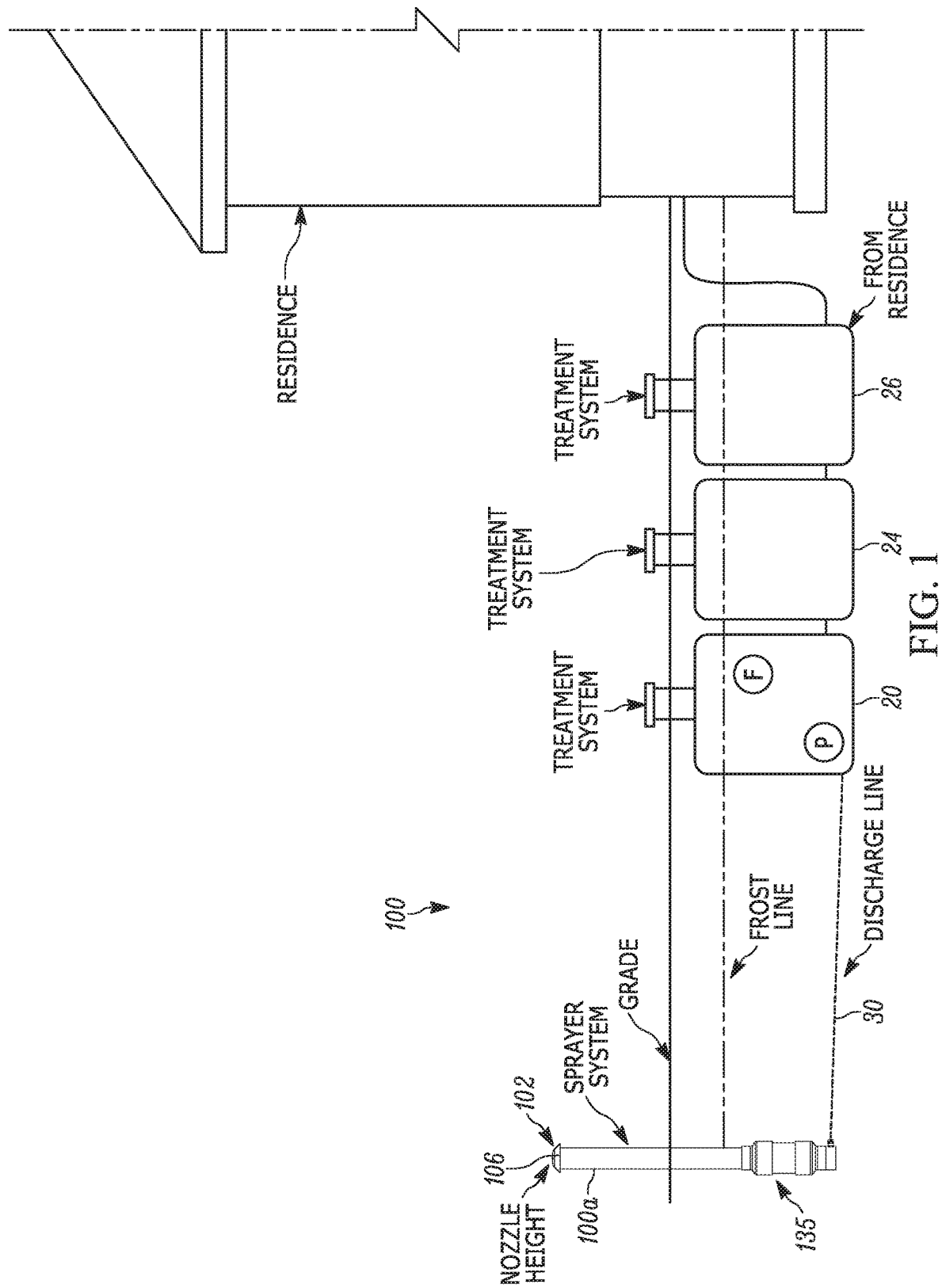
FIG. 1 is a schematic representation of a wastewater treatment system that includes a sprayer system constructed in accordance with a preferred embodiment of the invention.
Figure 2:
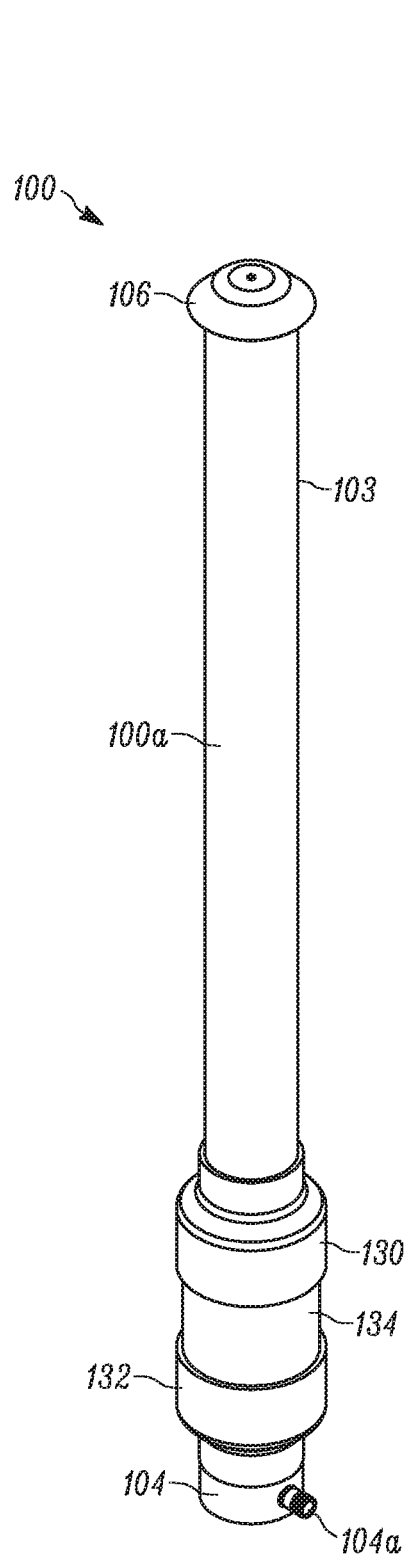
FIG. 2 is a perspective view of a sprayer system constructed in accordance with a preferred embodiment of the invention.
Figure 3:
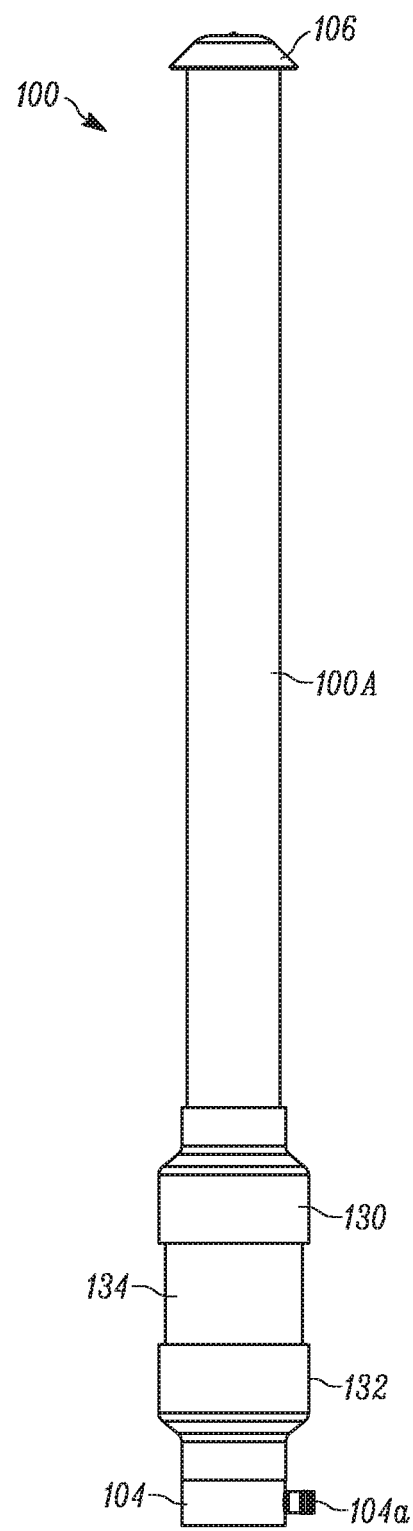
FIG. 3 is a side elevational view of the sprayer system shown in FIG. 2.

FIG. 1 illustrates the overall construction of a wastewater treatment system that utilizes a spray field and the present invention. The wastewater treatment or septic system shown in FIG. 1, includes a spray system 100 constructed in accordance with a preferred embodiment of the invention. Wastewater from the residence is delivered to the treatment system which, as seen in FIG. 1, includes three tanks 20, 24, 26. Treated wastewater is pumped from the final or leftmost tank 20 by a pump (not shown) into a discharge line 30. The discharge line 30 feeds the treated wastewater to the sprayer system 100 and is discharged through a sprayer head indicated generally by the reference character 102 forming part of the sprayer system of the present invention.

Referring to FIGS. 2-6, the overall construction of the sprayer system can be seen. Referring again to FIG. 1, a wastewater system constructed in accordance with a preferred embodiment of the invention, includes one or more treatment tanks 20, 28, 26 that receive waste or sewage from appliances, i.e., toilet, in a residence or other facility. The wastewater received by the treatment tanks is treated using conventional methods. Ultimately, the third or final tank 20 includes only a liquid waste. In more conventional septic systems, the waste liquid in the final tank is delivered to a "leach" field which, as is known, receives the wastewater and allows it to permeate through the soil.

According to the invention, the "leach field" of prior art treatment systems is replaced by a sprayer system indicated generally by the reference character 100 and included a sprayer assembly 100*a*. Wastewater from the final tank 20 is periodically pumped to the sprayer assembly which sprays the liquid onto the surrounding area. The sprayed liquid is ultimately absorbed by the ground that surrounds the sprayer assembly.

In the preferred method of operation, a float or similar device (not shown) form part of the final treatment tank 20 and when a level of wastewater in tank 20 exceeds a predetermined level, it signals a controller that wastewater should be pumped from the tank 20 to the spray assembly 100. In the preferred embodiment a pump is energized during nighttime hours until the float or other liquid sensor detects that the tank is substantially empty.

Figure 4:
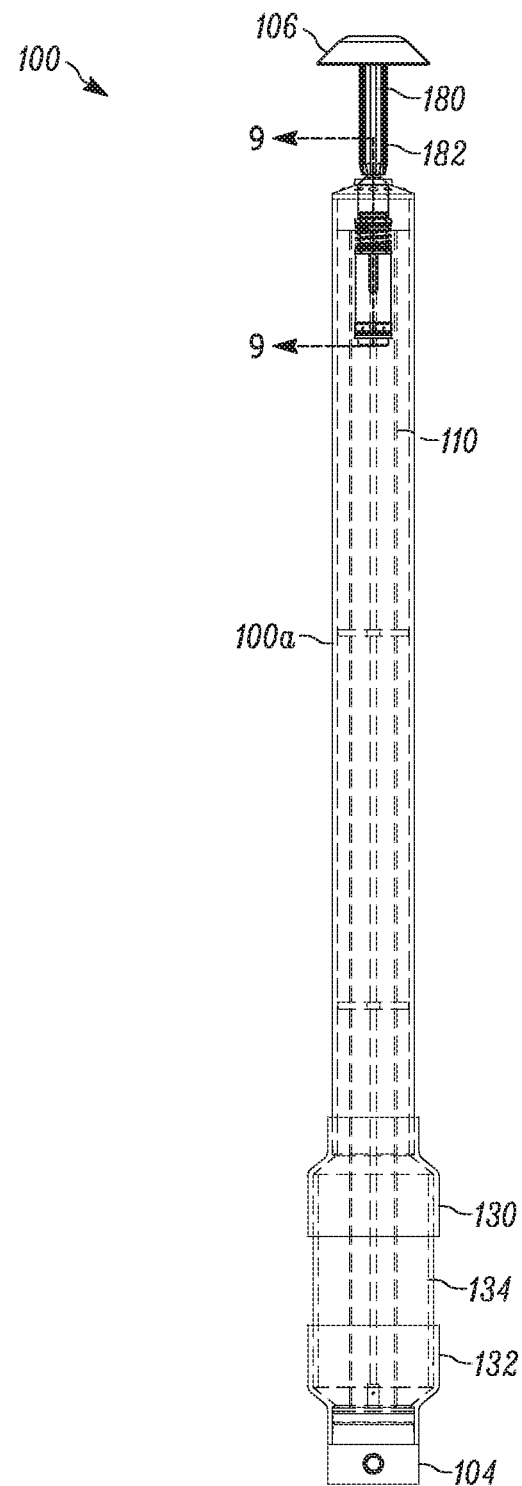
FIG. 4 is another side elevational view of a sprayer system constructed in accordance with a preferred embodiment of the invention.
Figures 5, 5A:
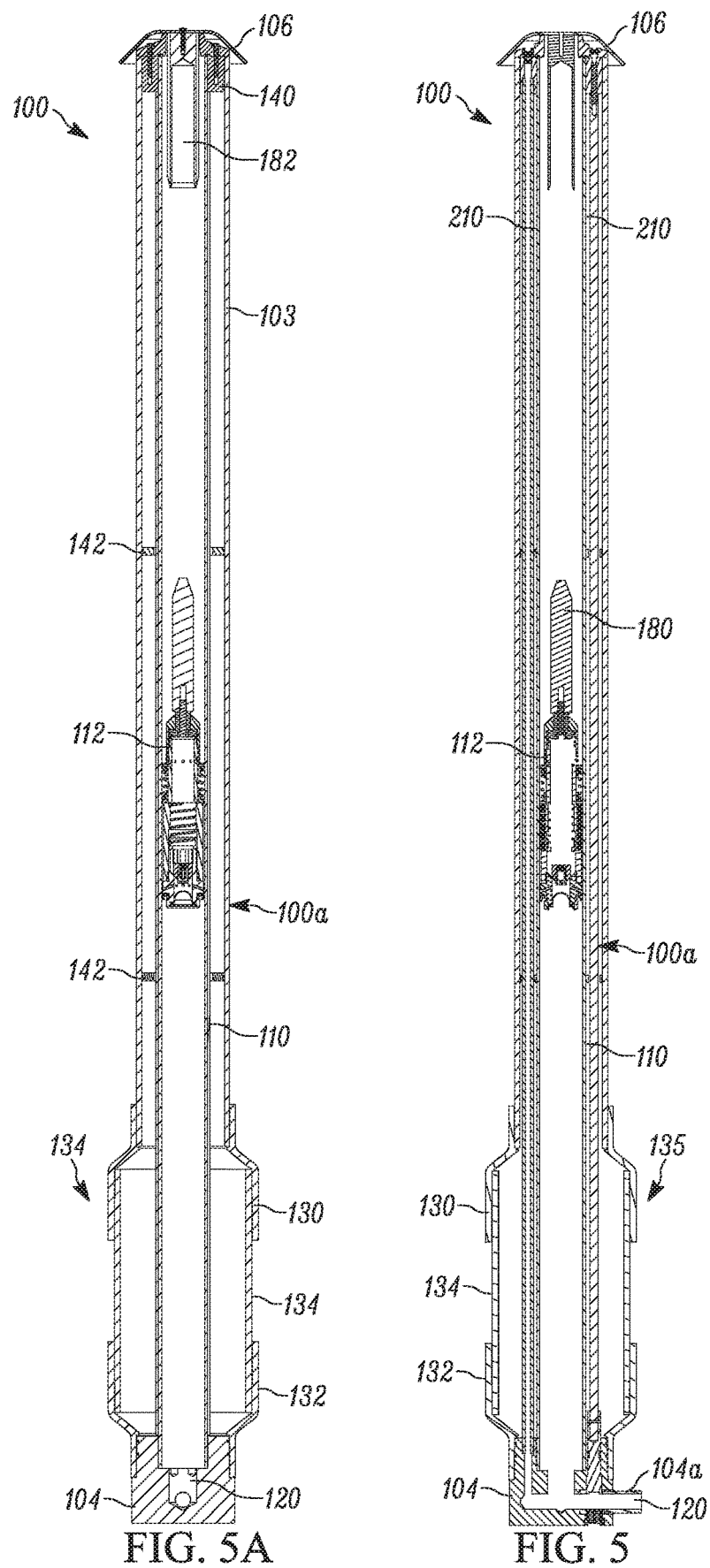
FIG. 5 is a sectional view of the sprayer system shown in FIG. 3.
FIG. 5A is another sectional view of the sprayer system rotated 90° from the position shown in FIG. 5.
Figure 6:
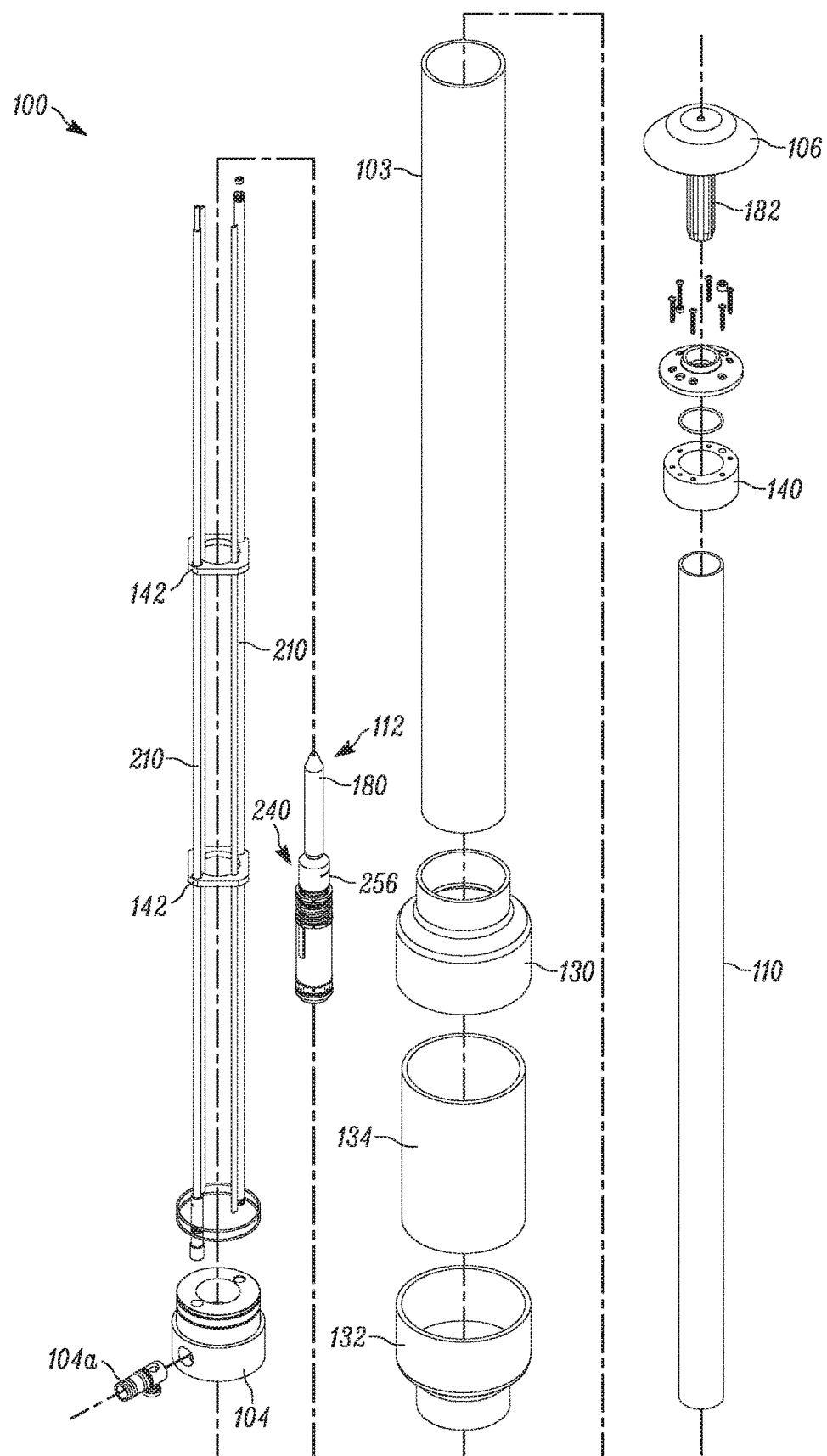
FIG. 6 is an exploded view of the sprayer system shown in FIG. 4.

Referring, again, to FIGS. 2-6, the construction of the spray assembly is illustrated. Referring, in particular, to FIGS. 5, 5A and 6, the sprayer assembly is tubular and includes an outer well casing or barrel 103 that extends upwardly from a well base 104 to a dust cover 106. In order to avoid freezing, the base 104 is located in the ground, below the frost line. This is also true of the wastewater feed line 30 that communicates the wastewater from the tank 20 to the base 104 of the sprayer assembly 100 via fitting 104a.

As seen best in FIGS. 5 and 5A, the sprayer system includes an inner piston receiving housing or casing 110 in which a piston assembly 112 is slidably received. When wastewater is not being pumped to the sprayer assembly 100, the piston assembly 112 rests at the bottom of the sprayer assembly near or on the base 104 of the sprayer assembly. In FIGS. 5, 5A, the piston assembly 112 is shown in an intermediate position that it moves through when wastewater is being pumped to the sprayer assembly. In operation, when wastewater is being discharged from the final tank 20, the wastewater is communicated to the bottom of the sprayer assembly indicated by the reference character 120. The pressurized wastewater communicated to the bottom 120 of the sprayer base exerts a force on the bottom of the piston assembly 112 urging the piston assembly upwardly. Referring also to FIG. 4, as will be further explained, the pressurized liquid wastewater drives the piston assembly 112 to an upper position within the piston casing 110 and moves a dusk cap 106 upwardly to uncover the top of the sprayer system which then exposes discharge or spray ports forming part of the piston assembly 112, thus spraying wastewater outwardly onto the ground that surrounds the sprayer assembly.

Referring to FIG. 6, the outer casing or barrel 103 is held to the base 104 by virtue of adaptors 130, 132 and a pipe sleeve 134. The lower adaptor 132 is suitably attached to the sprayer base 104. The adaptors 130, 132 and pipe sleeve define a geothermal heat chamber 135 located below the frost line. The chamber acquires heat from the surrounding ground which is typically at a temperature of 45° to 50° even in winter months. This heat is used to warm the water delivered to the sprayer assembly and inhibits icing in the sprayer assembly.

Figure 10A:
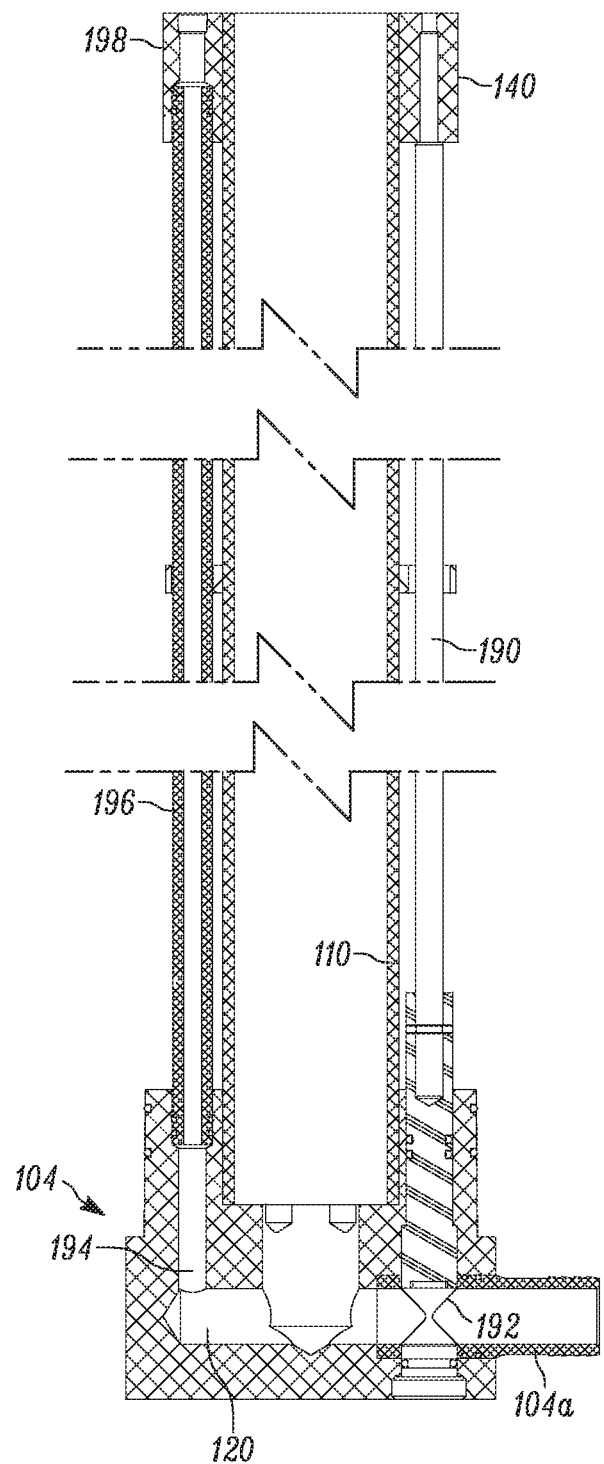
FIG. 10A is another sectional view of the sprayer system.

As indicated above, the piston assembly 112 is slidably received in the piston tube or casing 110 which, as seen in FIG. 10A is securely received by the base 104. The piston tube 110 extends upwardly and is securely received by an upper cap 140. As seen in FIGS. 5A and 6, the piston assembly case 110 includes barrel spacers 142 which locate the piston case 110 centrally with respect to the outside casing 103. In other words, the spacers 142 maintain the concentricity of the piston casing 110 with respect to the outside housing 103.

Figure 7:
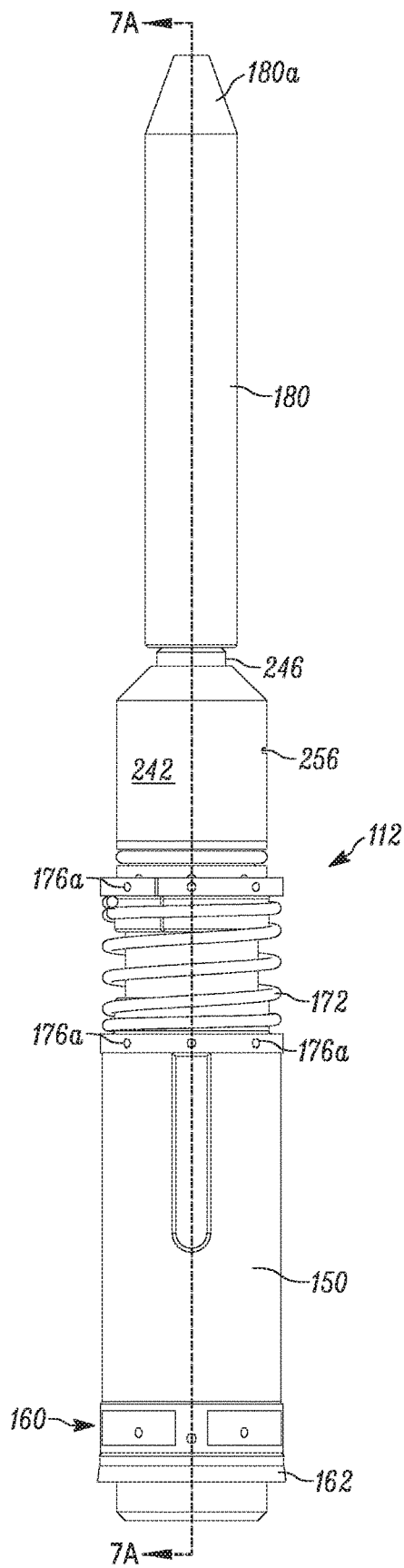
FIG. 7 is a side elevational view of a piston assembly forming part of the sprayer assembly shown in FIG. 6.
Figure 7A:
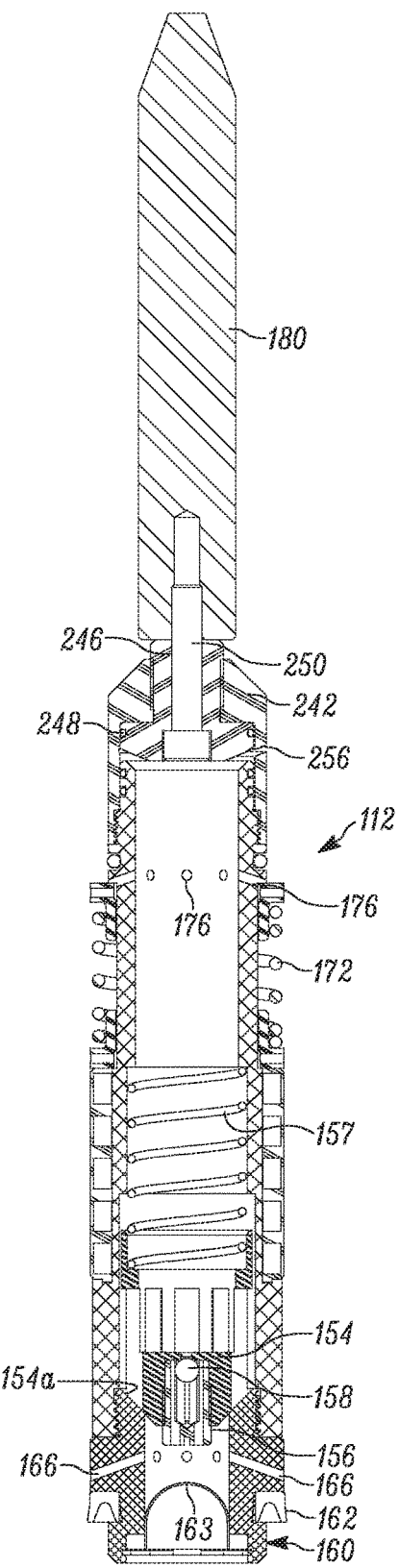
FIG. 7A is a sectional view of the piston assembly shown in FIG. 7.
Figure 8:
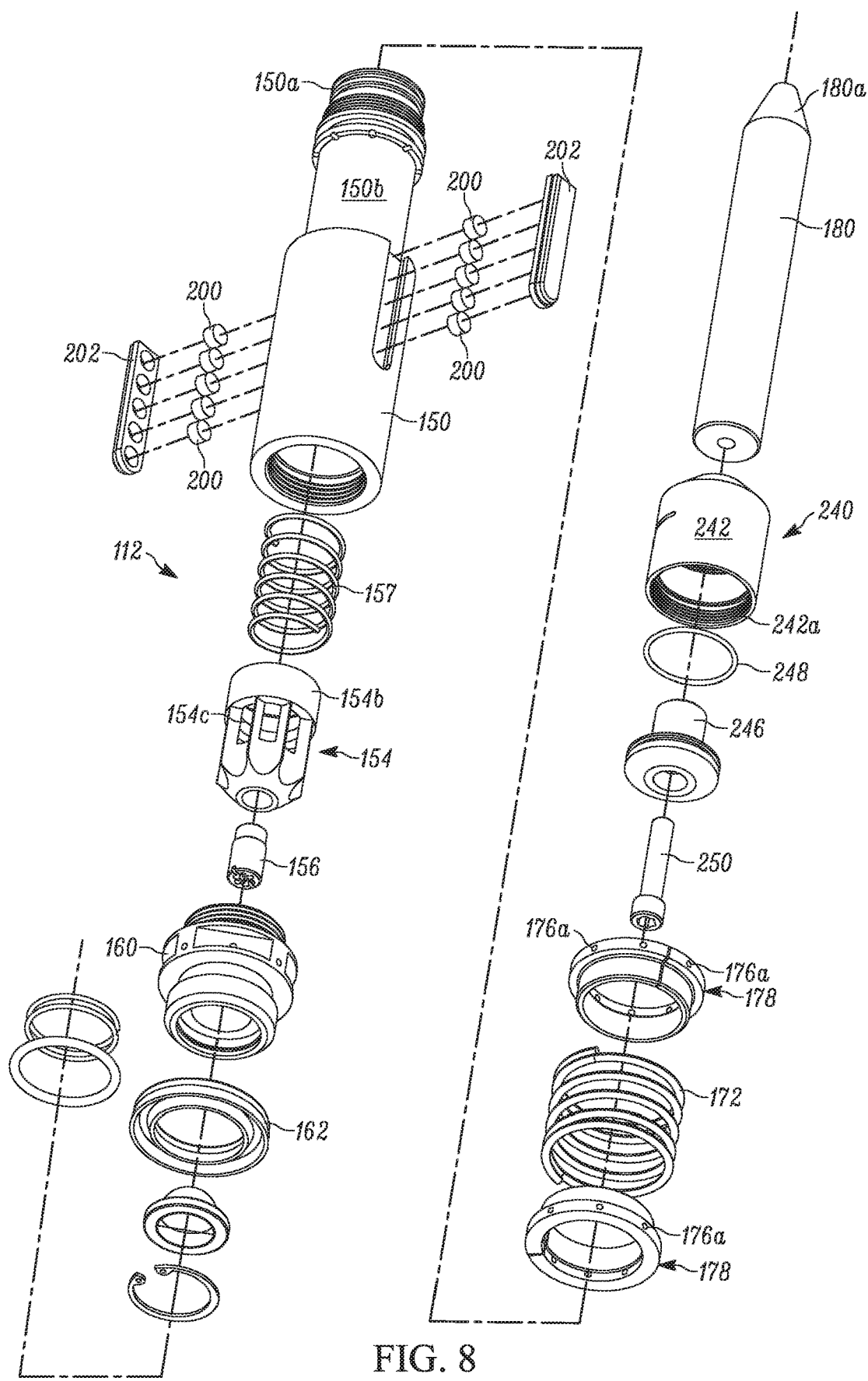
FIG. 8 is an exploded view of the piston assembly shown in FIG. 7.

The construction of the piston assembly 112 is best shown in FIGS. 7, 7A and 8. As seen best in FIG. 8, the piston assembly includes a piston housing 150. The lower end, as viewed in FIG. 8, receives a main check valve 154 which, a seen in FIG. 7A, is biased into engagement with its associated check valve seat 154a by a biasing spring 157. As seen in FIG. 8, the primary check valve 154 includes a cup section 154b which receives the bottom of the spring 157 and a plurality of slots 154c, which allows water to flow into the main flow channel 179 from the well base 104.

Figure 9:
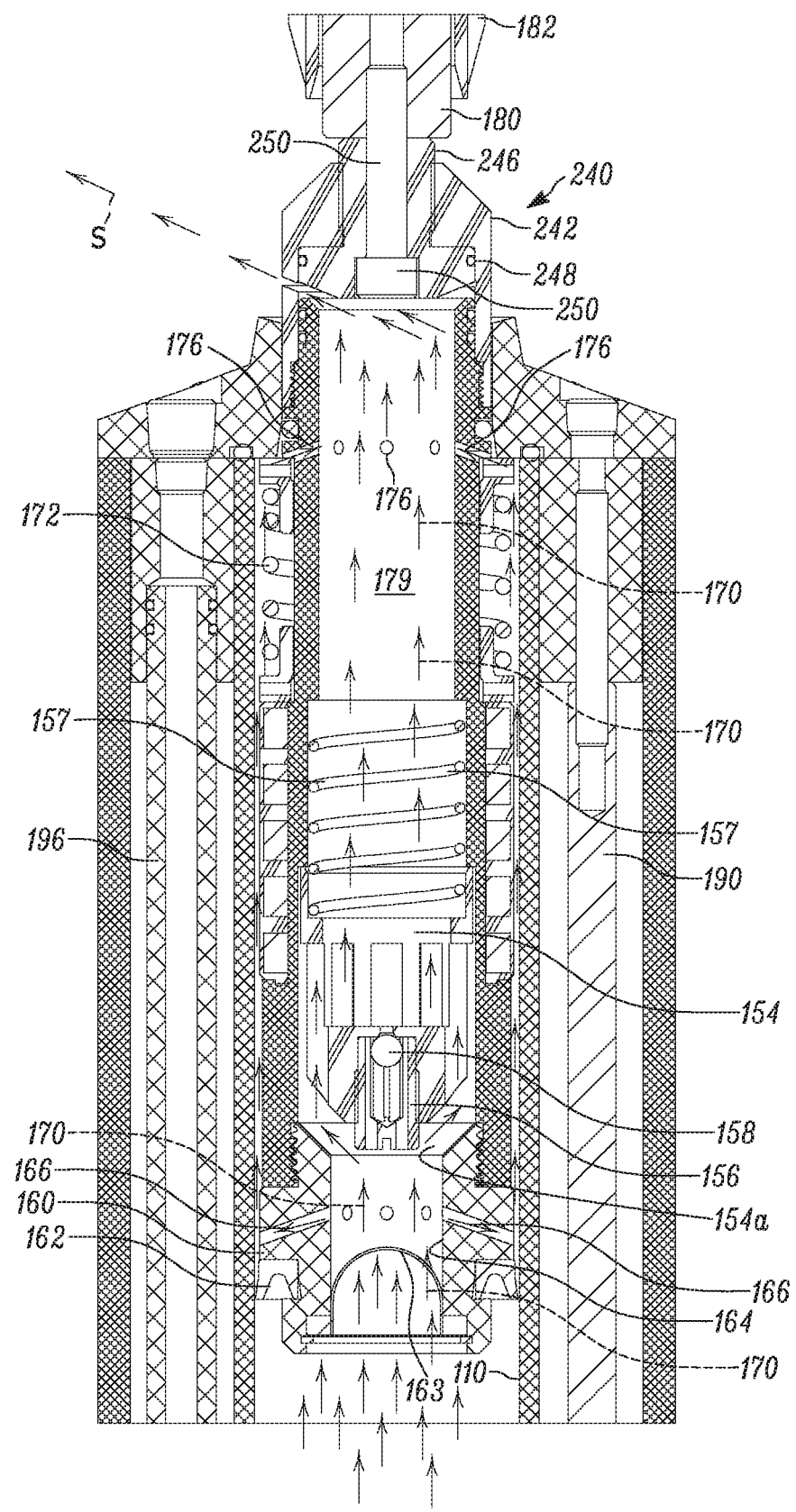
FIG. 9 is a fragmentary sectional view of the sprayer system as seen from the plane indicated by the line 9-9 in FIG. 4.

When wastewater is not being pumped to the spray assembly, the main check valve 154 is in engagement with its associated seat 154a as seen in FIG. 7A. Mounted centrally within the main check valve 154 is an air bleed assembly 156 which, as best seen in FIG. 9, includes a buoyant check ball 158 which acts as an air bleed to allow the escape of air from the sprayer base. Once the air is allowed to escape, liquid rising upwardly raises the buoyant ball 158 and causes it to engage its associated seat, thus blocking fluid flow past the main check valve 154. As should be apparent, once the air bleed ball 158 engages its seat, the pressurized fluid communicated to the bottom of the piston assembly 112 causes the piston assembly to move upwardly, thus causing the disengagement of the main check valve 154 with its associated seat 154a and also causes the upward movement of the piston assembly. It should be noted that the bottom end of the piston assembly defines an effective pressure area in fluid communication with water communicated to the well base, such that water in the well base exerts an upwardly directed force to the piston assembly causing the piston assembly to move from the well base to the distal end of the sprayer housing assembly. As seen best in FIG. 8, the primary check valve 154 is captured within the piston housing by a threaded coupling member 160. Mounted to the coupling member is a cup seal 162 which seals the interface between the piston assembly 112 and the piston assembly tube 110, thus causing the pressurized fluid to exert an upwardly directed fluid generated force on the piston assembly 112. The coupler 162 also carries a filter screen 163.

Referring to FIG. 9, the sprayer assembly includes a construction to inhibit freezing of the wastewater during the winter months. As should be apparent, water being pumped from the last wastewater tank 20 to the base 104 of the sprayer assembly 100 is always above freezing and typically is in the range of 50°. Wastewater communicated to the base 104 of the spray assembly 100 enters a central passage 164 forming part of the piston assembly coupler 160. The passage includes a plurality of narrow, restrictive passages 166 which communicate a portion of the wastewater being pumped to the outside of the piston assembly in a region indicated by the reference character 168. This "warm" water travels along the outside of the piston assembly 112 in the gap 168 defined between the outside of the piston assembly 112 and the inside surface of the piston assembly casing 110. The flow of wastewater to the outside of the piston assembly is restricted so that the bulk of the wastewater flow moves through the central region of the piston assembly, as indicated by the flow arrows 170.

The coil spring 157, which urges the primary check valve towards engagement with its associated seat 154a causes an upwardly directed force to be applied to the piston assembly which drives the piston assembly to its uppermost position within the piston assembly casing 110. This is the position shown in FIG. 9. The piston assembly includes a cushioning spring 172 which is compressed when the piston assembly reaches its uppermost position (shown in FIG. 9). As seen best in FIG. 8, the cushioning spring 172 is captured between a pair of retainers 178. The retainers are preferably split rings which snap together. The split rings 178 loosely engage a reduced diameter portion 50b of the piston housing 150. In other words, the rings 178 can slide relative to the housing 150 when the piston assembly reaches its uppermost position. It should be noted here that the restricted flow of wastewater that flows around the outside of the piston assembly rejoins the main central flow of wastewater by means of diagonal passages 176. The diagonal passages 176 communicate with the region outside the piston housing 150 by means of ports 176*a* formed in the retainers 178. This flow of warm wastewater around the outside of the piston assembly inhibits icing of the piston assembly tube 110 which could prevent the sliding movement of the piston assembly 112.

Referring to FIGS. 5, 6, 7A, 8 and 9, the piston assembly 112 mounts an elongate pin 180 (which may be metal for weight purposes), including a conical tapered top end 180*a*. The purpose of the pin 180 is to open the dust cap 106 located at the top of the sprayer assembly. As seen in FIG. 4, as the piston assembly 112 reaches its uppermost position within the piston casing 110, the pin 180 enters a hollow stem 182 forming part of the dust cap 106. As the piston assembly reaches its uppermost position, the pin 180 pushes the dust cap 106 upward, thus exposing the top of the sprayer system and allowing the wastewater to be sprayed through orifices, slots or other openings that are formed in an upper region of the piston assembly 112 (shown in FIG. 9). As a result, when the piston assembly 112 reaches its uppermost position, the dust cap is raised above the top of the outer casing which enables water discharged through the orifices to spray outwardly onto the areas surrounding the spray tube assembly.

As indicated above, a nozzle through which the water is sprayed is located in upper region of the piston assembly 112. Referring to FIGS. 8 and 9, a nozzle indicated generally by the reference character 240 is mounted to an upper end of the piston housing 150 (as viewed in FIG. 8). In particular, the nozzle includes a nozzle housing 242 which includes an internal thread 242*a* that is threadedly engageable with an upper thread 150*a* formed on the upper end of the piston housing 150 (as viewed in FIG. 8). The nozzle assembly 240 includes a plunger 246 and an associated O-ring. The plunger 246 is threadedly received by the housing 242. A stainless steel Allen bolt or other suitable fastener extends through the plunger 246 to threadedly engage the pin 180 to form an assembly that includes the pin 180, the nozzle housing 242, the O-ring 248 and the plunger 246.

Figures 11A, 11B:
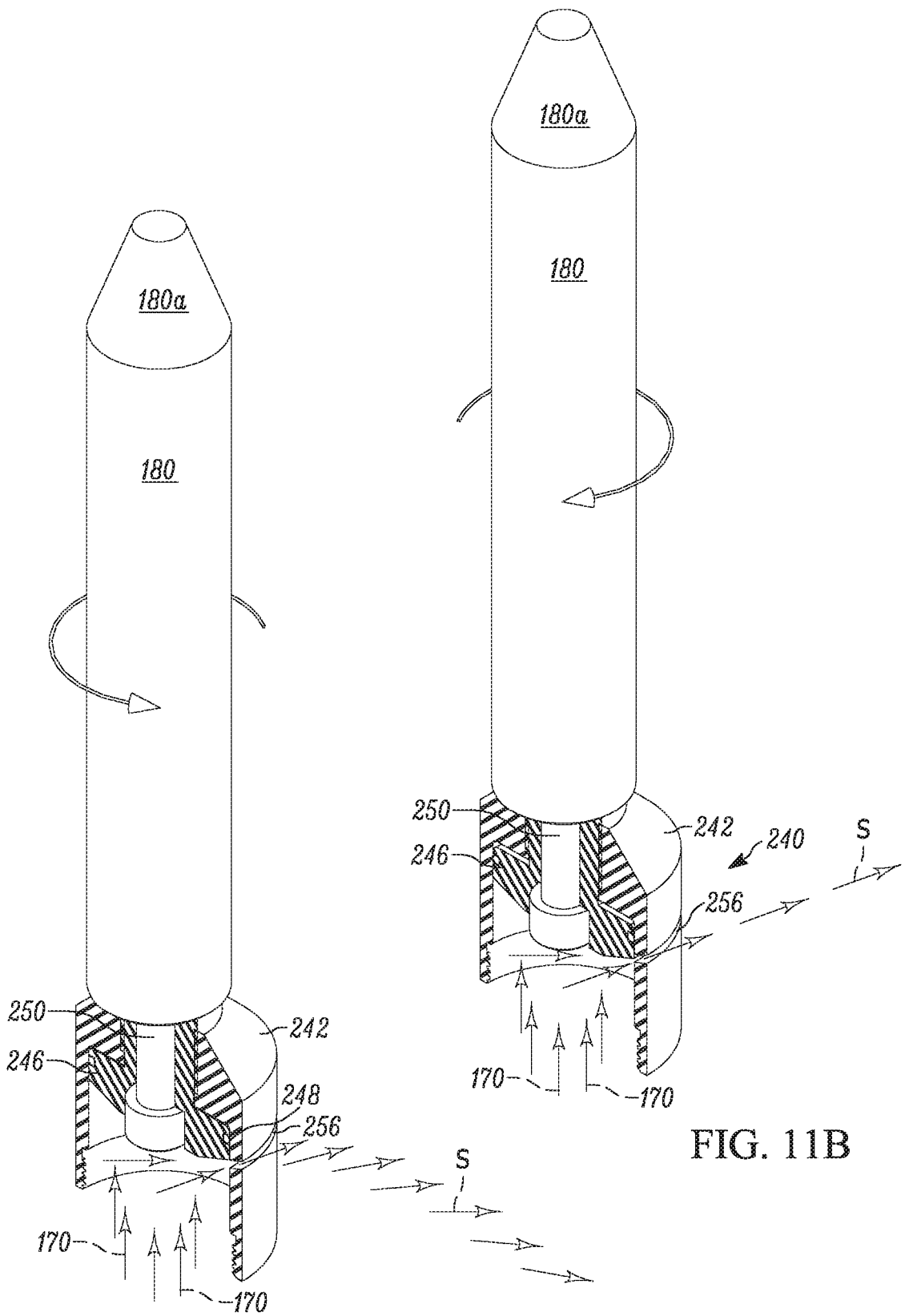
FIGS. 11A and 11B illustrate a perspective view of a nozzle constructed in accordance with a preferred embodiment of the invention.
Figure 12A:
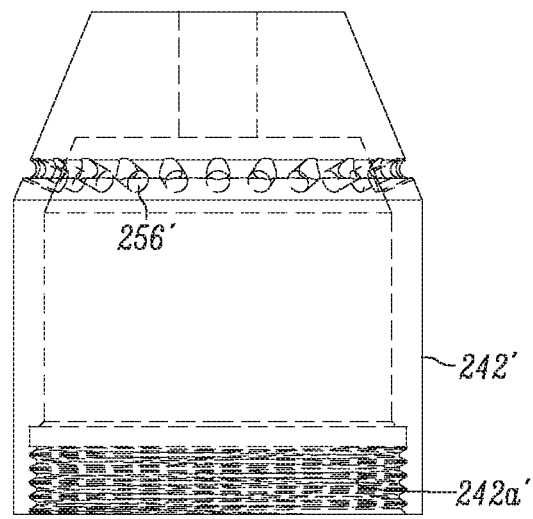
FIG. 12A is a side elevational view of a nozzle constructed in accordance with a preferred embodiment of the invention.
Figure 12B:
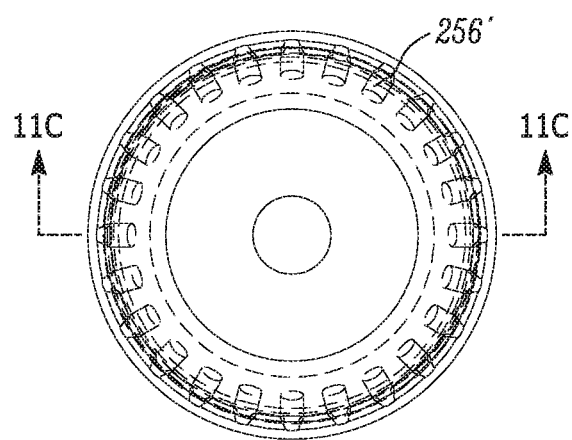
FIG. 12B is a top elevational view of the nozzle shown in FIG. 12A.
Figure 12C:
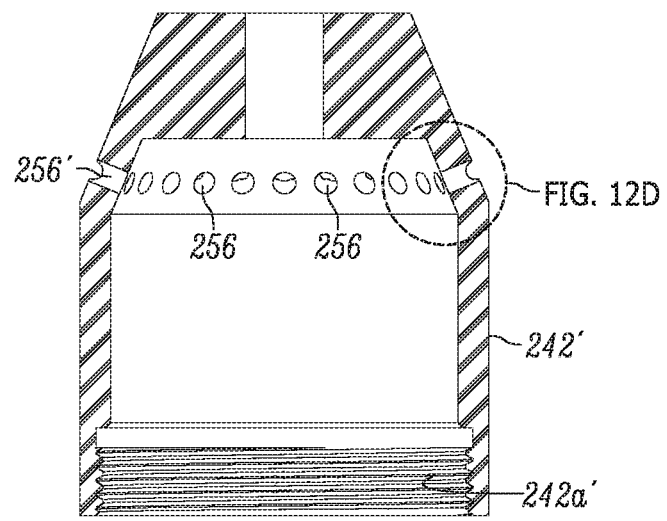
FIG. 12C is a sectional view of the nozzle shown in FIG. 12A as seen from the plane indicated by the line 12C-12C in FIG. 12B.
Figure 12D:
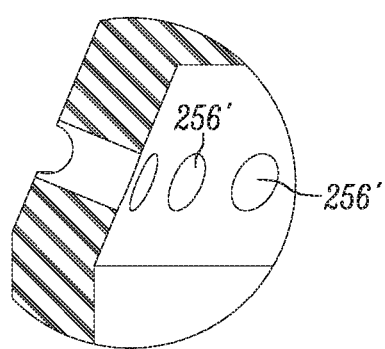
FIG. 12D is a fragmentary sectional view as seen from the circle indicated by the line 12D shown in FIG. 12C.

Referring in particular to FIGS. 11*a* and 11*b*, an adjustable nozzle constructed in accordance with a preferred embodiment of the invention is illustrated. As seen in these Figures, the nozzle housing 242 includes a slot 256 which, in the illustrated embodiment, spans 180°. The position of the plunger 246 within the housing 242 determines the effective size of the slot 256. The position of the plunger 246 within the housing 242 can be adjusted by holding the housing 242 and rotating the pin 180. Since the pin 180 is attached to the plunger 246 by the Allen bolt 250, rotation of the pin 180, while holding the housing 242 causes rotation of the plunger 246. Since the plunger 246 is threadedly connected to the housing 242, rotation of the pin 180 causes the plunger to move up and down within the housing 242, depending on the direction of rotation. The movement of the plunger 246 within the housing 242 changes the relative position between the plunger and the slot 256. As the plunger is rotated in the direction shown in FIG. 11B, it moves in a direction tending to close the slot 256. As seen in FIGS. 11A and 11B, the position of the plunger 246 relative to the slot 256, changes the spray pattern S. In FIG. 11A, the spraying distance S is less than the spraying distance shown in FIG. 11B.

According to this preferred embodiment, the adjustment of the nozzle opening can be achieved without requiring disassembly of the sprayer assembly. In particular, to adjust the effective nozzle opening and, hence, the spraying distance, a spraying cycle is initiated by communicating water under pressure to the base. This drives the piston assembly 112 to the distal end of the sprayer assembly. At this position, the pin 180 can be grasped and rotated while holding the nozzle housing 242 stationary. The pin 180 is rotated until the desired spray pattern and/or distance is achieved.

FIGS. 12A-12D illustrate another embodiment of a nozzle. In this embodiment, the spray nozzle includes fixed orifices and is non-adjustable. This alternate embodiment includes a nozzle housing 242'. The housing defines a plurality of fixed orifices 256'. In the illustrated embodiment, equally spaced orifices 256' are distributed around the housing 242' so that the spray pattern is 360°.

It should be noted here that when the pump is de-energized, the force tending to urge the piston assembly 112 upwardly is terminated and, as a result, the piston assembly 112 and the engaged dust cap is moved downwardly until the cap reengages the top of the spray tube or casing 100*a*. The piston assembly 112 then continues to move downwardly until the it again rests at the base 104 of the spray assembly 100. As indicated above, the pump operation is terminated once the final waste tank 20 is substantially empty. Since it is empty, any wastewater remaining in the spray assembly 100 is allowed to return to the final waste tank 20 as the piston assembly moves downwardly towards its rest position at the base 104 of the sprayer assembly 100*a*.

Figure 10:
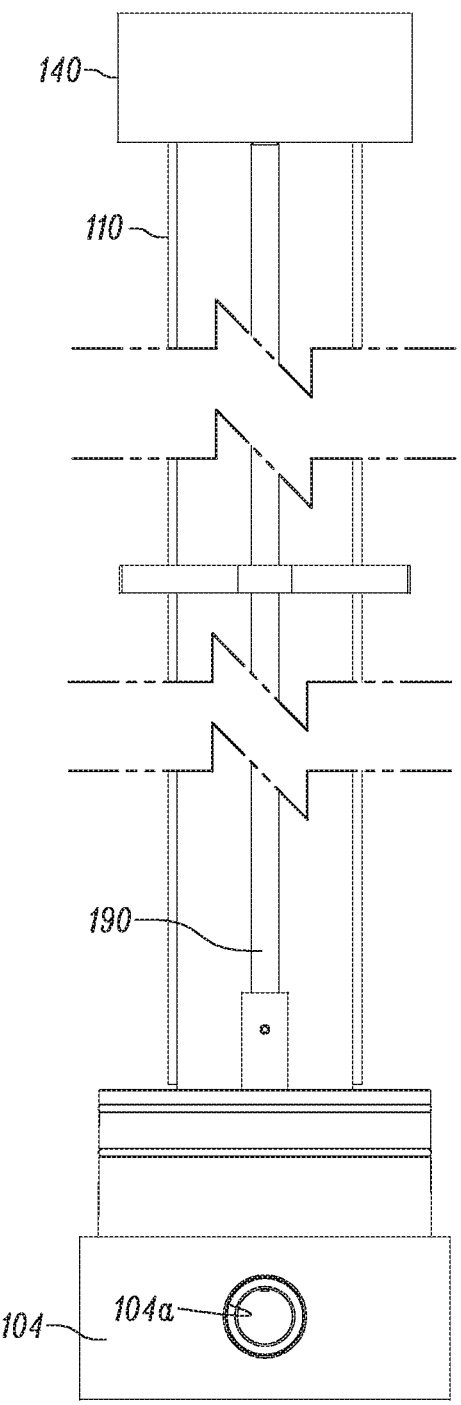
FIG. 10 is a fragmentary sectional view of the sprayer assembly.

Referring also to FIGS. 10A and 10, the rate of flow and/or pressure of the wastewater delivered to the sprayer assembly 100 can be adjusted without the need for removing the sprayer assembly from its location. In particular, an elongate rod 190 extends from the top of the sprayer to the base. As seen best in FIG. 10A, the lower end of the rod is attached to a throttle valve 192 which opens and closes, depending on the direction of rotation of the rod 190. At the top of the spray assembly, access is provided for a suitable tool that is engageable with the upper end of the rod, i.e., Allen wrench in order to effect rotation of the rod 190 to adjust the throttle assembly 192, thus adjusting the flow rate of wastewater delivered to the spray assembly.

In addition, provision is made for measuring the fluid pressure of the wastewater delivered to the base 104 of the spray assembly 100. As seen in FIG. 10A, a passage 194 communicates with the region 120 in the base 104 that receives wastewater. The pressure in this region is communicated to the top of the spray assembly by a conduit 196. The top of the conduit 196 (as viewed in FIG. 10A) is connected to a pressure gauge fitting 198 by which a pressure gauge can be attached to the tube 196 in order to monitor pressure of the wastewater delivered to the base of the spray system 100. The upper end of the tube 196, under normal operating conditions, will be fitted with a plug to close off the upper end of the pressure gauge conduit 196. When it is desired to measure the wastewater pressure, the plug is removed and a suitable pressure gauge is attached.

For many applications, it is important that the piston assembly 112 not rotate within its tube 110. This is especially necessary when the spray pattern delivered by the piston assembly 112 is not a uniform 360°. For some applications, the surface area on which the wastewater will be sprayed must be carefully controlled. For example, the terrain may require that the spray pattern be only 90° and that the spray only be received by a particular area that surrounds the sprayer assembly 100. In order to maintain a particular spray pattern on a defined surface area, it is important that the piston assembly 112 not rotate within the casing 100. In order to inhibit rotation of the piston assembly 112, as seen best in FIG. 8, a plurality of magnets 200 are attached to the piston housing 150. In the preferred embodiment, and as illustrated in FIG. 8, two groups of magnets, 180° apart, are mounted to the piston housing 150 and are held in position by associated caps 202 that slide into associated slots. The retainers 178 and spring 172 maintain the caps in their installed positions.

As also shown in FIGS. 5A and 9, a pair of metal strips 210 are attached to the outside of the piston assembly casing 110. These strips are 180° apart. The two groups of magnets 200 are attracted to the metal strips 210 as the piston assembly 112 moves within its tube casing 110. The attraction between the magnets 200 and metal strips 210 maintains the rotative position of the piston assembly 112 and applies an aligning force that resists rotation of the piston assembly within the piston casing 110.

A spray system assembly as shown in FIG. 1, has been constructed with the following parameters. The overall height of the spray assembly was 72". Approximately 30" of the spray assembly was located above ground, whereas the bottom 42" was buried below grade in order to take advantage of the geothermal heat available in the ground, below the frost line. The outer housing 103 of the spray assembly was approximately 4" in diameter. The inner casing 110, which supports the sliding movement of the piston assembly 112 was approximately 2" and was positioned concentrically within the outer housing 103 by the barrel spacers 142 (shown in FIG. 6). In the exampled spray system, the main check valve 154 was biased into engagement of its associated seat 154a. In this example, the spring 157 exerts a closing force of approximately seven pounds on the primary check valve 154. It was found that this sprayer assembly could spray water outwardly a radial distance of 31 ft. to 47 ft., depending on the nozzle and the pressure of the water delivered to the well base 106. A sprayer assembly with these dimensions can provide satisfactory performance, i.e., to dispense the treated wastewater that would be generated in a typical residence. If increased capacity is required, multiple spray assemblies can be employed.

It should be noted here that the primary focus of the disclosure was the use of a spray assembly to spray pre-treated wastewater for absorption by the ground that at least partially surrounds the sprayer assembly. The present invention contemplates using the disclosed sprayer system for applications other than wastewater treatment, such as irrigation or the spreading of sanitary or potable water. It is believed that aspects of this invention may have utility in these other applications, especially those applications that require the spraying of water during conditions where the outside air temperature falls below freezing.

Although the invention has been described with a certain degree of particularity, it should be understood that those skilled in the art can make various changes to it without departing from the spirit or scope of the invention as hereinafter claimed.

The invention claimed is:

1. A septic wastewater treatment system for treating sewage wastewater, comprising:
   a) at least one treatment tank for receiving and treating sewage wastewater from a sewage source;
   b) a pump for pumping treated sewage wastewater from said tank to a sprayer system during a spraying cycle;
   c) a discharge line fluidly communicating said treatment tank with said sprayer system;
   d) said sprayer system comprising:
      i) a substantially vertical tubular outer housing extending from a well base to a distal end from which treated sewage wastewater communicated to said sprayer system from said treatment tank is discharged onto an area that at least partially surrounds said sprayer system, said well base located below ground level at a level that is below a frost line and said distal end located above ground level;
      ii) said sprayer system further including an inner tubular housing located within said outer tubular housing, said inner tubular housing extending from said well base and slidably supporting a piston assembly for movement between said well base and said distal end of said tubular outer housing in response to treated sewage wastewater pumped from said tank to said well base by said pump;
      iii) said well base defining a geothermal heat chamber located below said frost line for acquiring heat from the surrounding ground, for warming air inside the chamber and surrounding said inner tubular housing, whereby icing is inhibited while the sprayer assembly is at rest in the wall base during below freezing temperatures;
      iv) said piston assembly including a piston housing, a primary check valve carried by said piston housing that is biased into engagement with an associated seat by a predetermined biasing force and said a spray nozzle being located downstream of said main check valve such that the flow of treated sewage wastewater to said nozzle is blocked when said main check valve sealingly engages its associated seat and said flow of treated sewage wastewater is allowed to proceed to a main flow passage when said main check valve is disengaged from its associated seat;
      v) said inner tubular housing defining an inner cylindrical surface for slidably supporting said piston assembly, said piston assembly defining an outer cylindrical surface that confronts said inner cylindrical surface, said confronting surfaces defining a gap region;
      vi) a radial seal carried by said piston assembly upstream of said main check valve, said piston assembly including a restricted passage located below said main check valve and above said radial seal for communicating a restricted flow of sewage wastewater from said well base to said gap region, said flow in the gap region being induced by a pressure differential created by the main check valve biasing force, said restrictive passage allowing a portion of said treated sewage wastewater from said well base to flow around said outer cylindrical surface of said piston assembly and further comprising a return passage spaced downstream from said restricted passage for communicating said portion of said treated sewage wastewater to said main flow passage, whereby both the main flow of treated sewage wastewater and said portion of said treated sewage wastewater communicated to said gap region are delivered to said nozzle to inhibit icing in said inner housing, thereby enabling said sprayer system to operate in below freezing temperatures during the spraying cycle.

2. The apparatus of claim 1 wherein said piston assembly includes an air bleed for allowing air delivered to said well base to escape when pumping of said treated sewage wastewater from said tank is initiated.

3. The apparatus of claim 1 wherein said sprayer system includes a dust cap located at the distal end of said tubular outer housing, said piston assembly including a dust cap opening member which engages said dust cap and moves it to a spaced position when said piston assembly reaches its spraying position at the distal end of said sprayer housing.

4. The apparatus of claim 1 wherein said piston housing mounts a plurality of magnets and said sprayer system further includes a pair of metal strips associated with said magnets, said metal strips being mounted between said inner tubular housing and said outer housing and are arranged so that the magnets mounted to said piston assembly are attracted to said metal strips whereby said piston assembly is maintained in a predetermined aligned position within said sprayer assembly.

5. The apparatus of claim 1 wherein said spray nozzle includes a plurality of fixed orifices through which treated sewage wastewater is sprayed.

6. The apparatus of claim 1 wherein said nozzle carried by said piston assembly includes an adjustable spray opening whereby a spray pattern of said nozzle can be adjusted.

7. The apparatus of claim 1 wherein said well base mounts a throttling valve for adjusting the quantity of wastewater delivered to a region located below said piston assembly, said throttling valve including an adjustment member whereby said throttling valve can be adjusted.

8. The apparatus of claim 1 wherein said sprayer system includes a conduit extending from said well base to a distal end of a sprayer housing, said conduit having a conduit distal end located near said distal end of said sprayer housing whereby a pressure gauge can be attached in order to monitor the fluid pressure of said treated sewage wastewater delivered to said base.

9. The apparatus of claim 1 wherein said predetermined biasing force is provided by a spring.

10. A septic wastewater treatment system for treating sewage wastewater, comprising:

a) at least one treatment tank for receiving and treating wastewater from a sewage source;

b) a pump for pumping treated wastewater from said tank to a sprayer system during a spraying cycle;

c) a discharge line fluidly communicating said treatment tank with said sprayer system;

d) said sprayer system comprising:

i) a substantially vertical outer tubular housing extending from a well base to a distal end from which treated wastewater communicated to said sprayer system is discharged onto an area that at least partially surrounds said spray system, said well base is located below ground level at a level that is below a frost line and said distal end located above ground level;

ii) said well base defining a geothermal heat chamber located below said frost line for acquiring heat from the surrounding ground;

iii) said spray system further including an inner tubular housing located within said outer tubular housing and extending from said well base, said inner tubular housing slidably supporting a piston assembly for movement between said well base and said distal end of said tubular housing in response to treated wastewater pumped from said tank to said well base by said pump;

iv) a fluid circuit for warming said piston assembly to inhibit icing of said piston assembly, said fluid circuit comprising a restricted port located at a lower end of said piston assembly for communicating a restricted flow of wastewater from an inlet of said piston assembly to a gap region defined between an outer cylindrical surface of a piston housing and an inner cylindrical surface defined by said tubular housing and a return passage located at an upper end of said piston assembly and spaced from a lower restricted passage whereby wastewater communicated to said piston assembly is allowed to flow from said restricted port to said return passage by way of said gap region thereby warming said piston assembly to inhibit icing during below freezing temperatures;

v) said piston assembly including a main flow passage for delivering treated wastewater from said piston housing inlet to a discharge end of said piston assembly where by said fluid warming system enables said spray system to spray wastewater in below freezing temperatures.

11. The apparatus of claim 10 further including a piston housing, and a primary check valve carried by said piston housing that is biased into engagement with an associated seat, said primary check valve located in said piston assembly above said restricted port and does not control the flow of wastewater to said restricted port and a spray nozzle located downstream of said main check valve such that the flow of treated wastewater from said primary check valve to said nozzle is blocked when said main check valve sealingly engages its associated seat and said flow of treated wastewater is allowed to proceed to a main flow passage when said main check valve is disengaged from its associated seat.

* * * * *